2 Sheets--Sheet 1.
J. T. McELHINEY.
Combined Corn-Planters and Plows.
No. 137,309. Patented April 1, 1873.
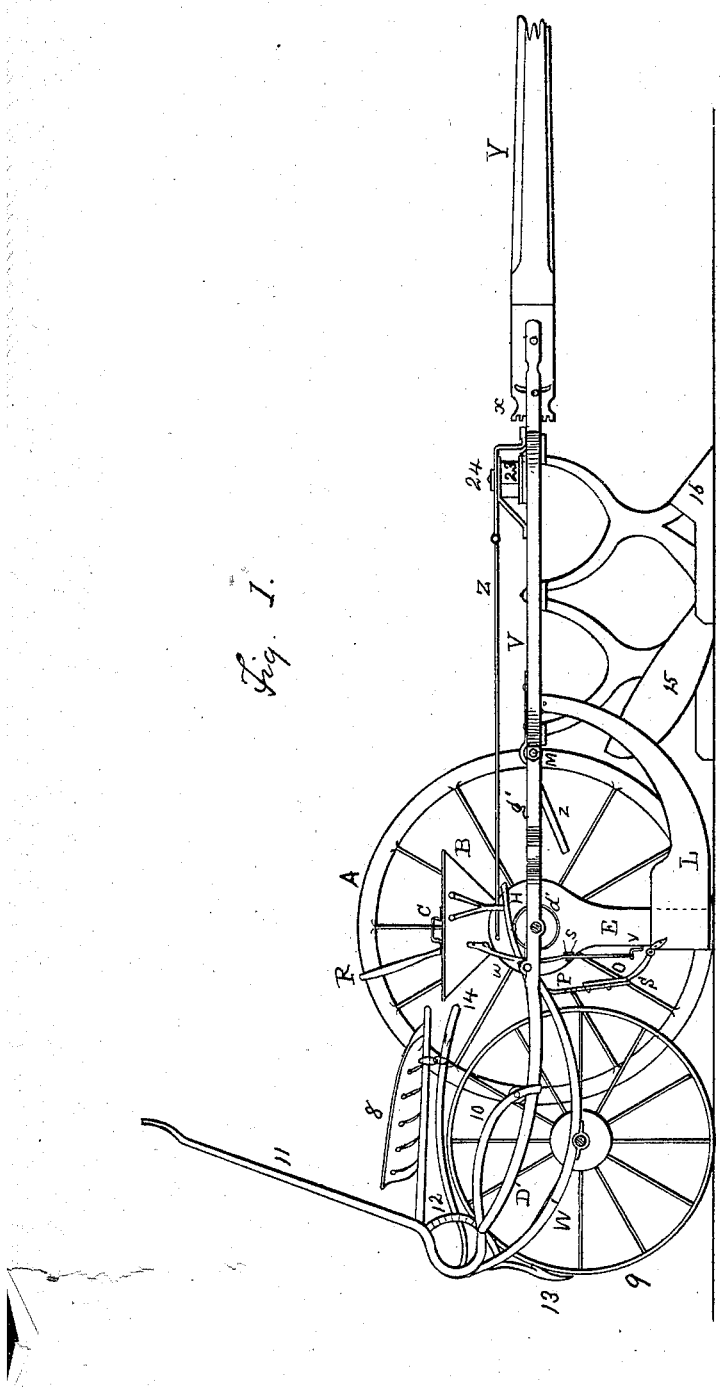
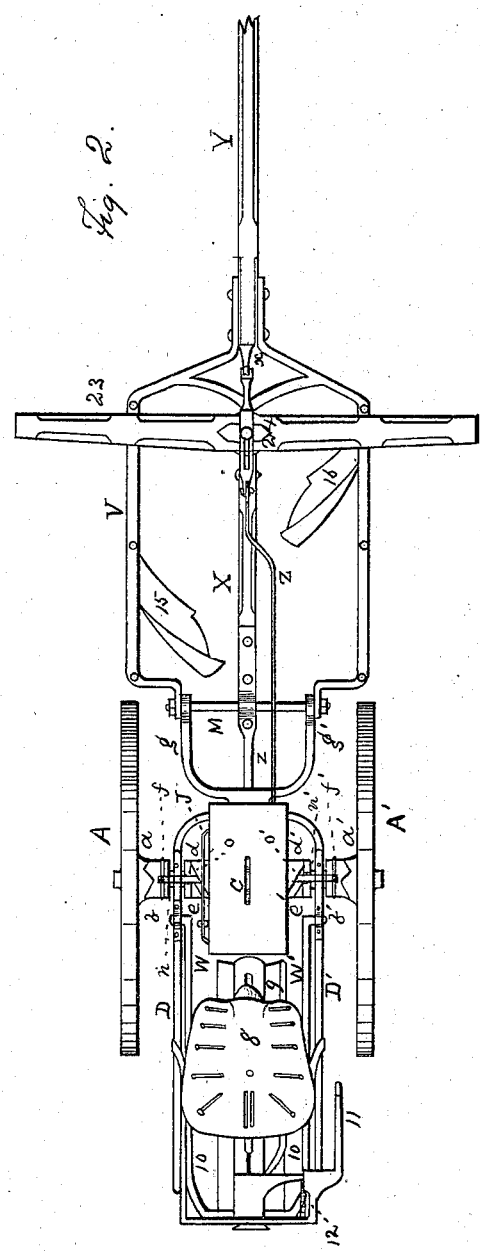
WITNESSES
Theodore Fay
S. A. Taylor
INVENTOR
John T. McElhiney by
Saml. S. Boyd
Atty
AM. PHOTO-LITHOGRAPHIC CO. N.Y. (OSBORNE'S PROCESS.)

J. T. McELHINEY.
Combined Corn-Planters and Plows.

No. 137,309. Patented April 1, 1873.

WITNESSES
Theodore Lay
S. N. Taylor

INVENTOR
John T. McElhiney by
Saml. S. Boyd
Atty

UNITED STATES PATENT OFFICE.

JOHN T. McELHINEY, OF MOBERLY, MISSOURI.

IMPROVEMENT IN COMBINED CORN-PLANTERS AND PLOWS.

Specification forming part of Letters Patent No. 137,309, dated April 1, 1873; application filed January 11, 1873.

*To all whom it may concern:*

Be it known that I, JOHN T. McELHINEY, of Moberly, Randolph county, State of Missouri, have invented a new and useful Improved Corn-Planter and Plow Combined, of which the following is a full, clear, and exact description, reference being had to the annexed drawing making a part of this specification, in which—

Figure 5:
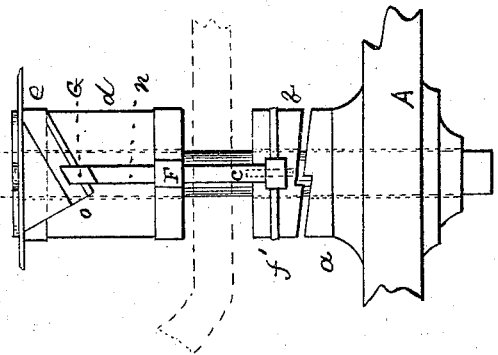
Figure 4:
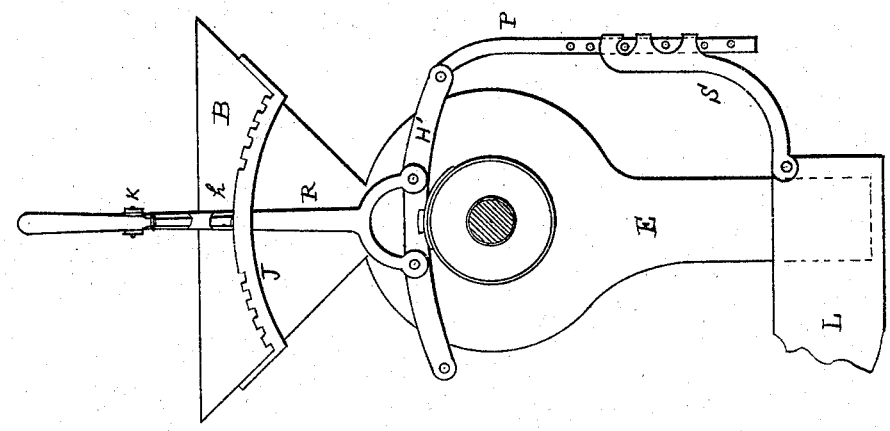
Figure 3:
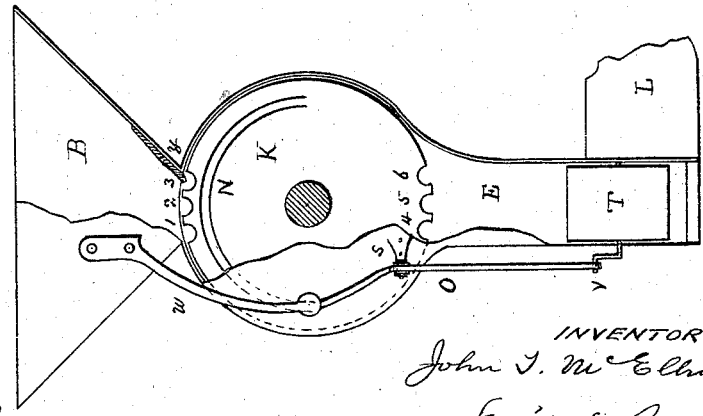

Figure 1 represents a side elevation of my invention. Fig. 2 represents a top plan of same. Figs. 3 and 4 represent opposite side views of the hopper and its attachment. Fig. 5 represents an enlarged detached view of a portion of the axle and its attachments.

Similar letters indicate like parts.

The object of my invention is to produce a machine which shall prepare the ground for the corn, plant the corn, and cover it at one and the same " drive."

The machine is mounted upon two wheels, A A', Fig. 2, A, Figs. 1, 5, which are loose upon their axle, the inner side of either hub forming one half of a clutch-box, as seen clearly in Fig. 2, at $a\ a'$, and $a$, Fig. 5. The other part of the clutch $b\ b'$, Fig. 2, $b$, Fig. 5, slides upon a feather, $c$, Fig. 5, fixed in the axle, and being thrust into gear with the part $a\ a'$, as will be hereafter explained, causes the axle to revolve with the wheels A A'. The hopper B, Figs. 1, 2, 3, 4, has two sleeves, $d\ d'$, Fig. 2, $d'$, Fig. 1, $d$, Fig. 5, attached to its sides, which fit loosely upon the axle, so as not to be affected by its motion. The hopper terminates in a spout or funnel, E, as seen in the several figures. Upon these sleeves are loose collars $e\ e'$, Fig. 2, $e$, Fig. 5, and upon each of these collars are two spiral grooves—one above and one below the axle—$o\ o'$, being shown in Fig. 2, and $o$ in Fig. 5, while the other two, $o''\ o'''$, being beneath the axle, are not shown, they being the same, however, as the top ones, save that the groove is reversed. On the clutches $b\ b'$ are loose rings $f\ f'$, Fig. 2, $f'$, Fig. 5, and to each ring are attached two rods, $n\ n'\ n''\ n'''$, one above and one below the axle, two of them, $n\ n'$, being seen in Fig. 2, and one, $n$, in Fig. 5. These rods terminate in hooks G G' G'' G''', G being clearly shown in Fig. 5, the hooks engaging with the grooves on the collars $e\ e'$. Guide-straps, as seen at F, Fig. 5, attached to the sleeves $d\ d'$, serve to steady these rods. To the collars $e\ e'$ are attached two horizontal levers, H H', the former being seen in Fig. 1, and the latter in Fig. 4, the two being connected by pins, as indicated in Fig. 4, their ends being curved around the hopper for this purpose. From the center of the lever H' rises the forked lever R, Figs. 1, 4, passing between the hopper and the rack J, Figs. 2, 4, with the teeth of which a spring-catch, $h$, attached to the handle of the lever by a pin, $k$, engages. At the rear end of the levers H H', at the point of union, is attached a rod, P, Figs. 1, 4, working in a sleeve on the rod S, which latter is attached to the heel of the shoe L, Figs. 1, 3, 4, the shoe being made so that it can slide up and down upon the spout of the hopper. The sleeve and the rod P are both perforated, as seen in Fig. 4, so that by means of a pin the heel may be adjusted vertically. The toe of the shoe is curved upward and attached to the pole of the machine, as seen in Fig. 1, by a pivot.

The feeding apparatus is constructed as follows: Inside of the top of the spout of the hopper, and fitting snugly therein, is a wheel, K, Fig. 3, keyed to the axle, and having upon its periphery two series of seed-cups, 1, 2, 3, &c., arranged, as seen in Fig. 3, on opposite sides of the wheel, so that a line drawn through the center of the wheel would pass through the middle of the two series. On the face of the wheel is a channel, N, extending one-half around the wheel, and so arranged that a line drawn through its two extremities would pass through the center of the wheel, but at right angles to the imaginary line passing through the middle of the seed-cups, as above described. A lever, O, Figs. 1, 3, working on a pivot, $s$, attached to the spout, has on one end a stud which passes through the sides of the spout at such a point as to be in the line of the channel N, a spring, $w$, keeping the stud constantly in contact with the surface of the wheel. The other end of the lever O is attached to the crank V on the spindle of the valve T, Figs. 1, 3, which plays in the nose of the spout E. The hopper is provided with a sliding cover, C, Figs. 1, 2, and inside of the hopper is a scraper, $y$, Fig. 3, which evens off the seed-cups as they revolve under it. Attached to the axle, but working freely upon it, are two arms, D D', Fig. 2, D', Fig. 1, which, passing around the spout, unite, as seen, in front of it, and again separate, forming two arms, $g$ $g'$, which are connected by the bolt M, which constitutes a pivot for the ends of plow-frame V, Figs. 1, 2, and of the extension X of the pole Y, the latter being connected to the front forks of the frame V by two bolts, as seen in Figs. 1, 2, the rear bolt working in a slot, as seen in the former figure, so that the pole may have free vertical play. To the end of the pole Y is attached a toothed segment, $x$, with which the point of the rod Z may be made to engage at the pleasure of the driver, the end of the rod being, as seen in Fig. 1, hung in a bracket attached to the hopper so as to be within reach of his foot when he is mounted upon the machine. Fig. 1 shows this rod disengaged, and Fig. 2 presents it as engaged with the segment of the pole. To the end of X is attached a bent rod, $z$, Figs. 1, 2, which extends, as shown, beneath the point of union of the arms D D', thus limiting the play of the extension X in one direction vertically, for a purpose hereafter to be explained. The double-tree 23 is of the usual form and attached by a pin, 24, in the ordinary manner, its pin forming a guide for the end of the rod Z, which is slotted, as seen clearly in Fig. 2. Pivoted to the arms D D' are two arms, W W', Fig. 2, (W', Fig. 1,) which, curving upward, as seen, give support to the driver's seat 8, Figs. 1, 2, which, as seen in the latter figure, slides in a slot in the arms, so as to be adjustable longitudinally. These arms also afford bearings for the axle of the wheel 9, Figs. 1, 2, which revolves between them, and, like all covering-wheels, has a broad tread, somewhat concave on its face. To these same arms W W' are pivoted the arms 10 10, the ends of which have slots, through which pass the ends of the arms D D', there being friction-wheels in the slots above the arms D D', as seen clearly in Fig. 1. To one of the arms 10 10 is attached a lever, 11, Figs. 1, 2, which plays in a ratchet, 12; also, pivoted to arms W W', just beneath the arms 10 10, is a scraper, 13, having attached to it a lever, 14, the forward end of which hangs in a ring under the driver's seat, as seen clearly in Fig. 1. To the plow-frame V are attached the plows 15 16, the land-side of each being outward, so that the furrows shall be thrown toward each other, thus forming a ridge. The plows are so adjusted that the land-sides will leave a cutting in which the wheels A A' may follow.

The operation of the machine is as follows: The shoe L is first adjusted by means of the rod P and S to the desired depth; then, by means of the lever R, the driver, who is upon the seat 8, throws the clutches $b$ $b'$ into gear with the clutches $a$ $a'$. The team then being started the plows 15 16 throw their furrows into a ridge, into which the toe of the shoe L enters and gradually opens it till the heel has passed through, when the covering-wheel 9 following covers the corn dropped into the channel made by the shoe, the lower edges of the heel of the shoe being made somewhat flaring in order to cause the earth to fall behind it as it passes along. The dropping of the corn is accomplished in the following manner: The revolution of the axle of the wheels A A' causes the feed-wheel K to turn, also carrying with it its charges of seed in the cups 1, 2, 3, &c., and dropping them at every half revolution into the spout E on the valve T. Now as this valve is connected with the lever O, the point of which, as before explained, passes into the case of the spout, and presses constantly against the face of the feed-wheel in the line of the channel N, it, of course, enters and passes out of the channel at each revolution of the feed-wheel, thus causing two vibrations of the lever O and a corresponding opening and closing of the valve T. As, then, the seed is dropped it falls upon the valve, which, by the action of the channel on the end of the lever, is sharply opened, allowing it to fall in a body into the opening made for it by the shoe, and thus making a dropping at every half revolution of the wheels A A'. Now, when it is desired to turn the machine around, or to transport it from place to place, the lever R is reversed, which throws up the heel of the shoe through the action of the horizontal levers H H', and at the same time, by the action of the grooves $o$ $o'$, &c., on the rods $n$ $n'$, &c., the clutches $b$ $b'$ are thrown out of gear with $a$ $a'$, thus allowing the wheels A A' to revolve upon their axle without affecting the feed-wheel; the point of the rod Z is then thrown into gear with the segment $x$ on the pole, thus destroying the power of the pole to move vertically independently of its extension; then by means of the lever 11 the driver raises the plow-frame V so as to free the plows from the ground, the curved arm $z$ on the end of the extension X during this movement being brought into contact with the point of union of the arms D D', thus preventing the frame V from falling vertically on the rod M as the arms $g$ $g'$ are raised by the action of the lever 11. The same movement of the lever 11 raises the covering-wheel 9, so that the whole machine rests upon the wheels A A', the adjustability of the driver's seat enabling him, in a measure, to counteract any inequality in the weight of the two ends of the machine when thus balanced upon the axle of A A'.

To start the machine again for planting, the plows are dropped by withdrawing the point of Z, and releasing the lever 11, and reversing the lever R. Whenever the covering-wheel becomes clogged the driver can clear it by working the lever 14 of the scraper 13.

The size of the various parts may, of course, be varied at pleasure, the driving-wheels, however, being always made of a circumference twice as great as the distance it is proposed to have the hills apart. A very good size for the wheels is from seven to seven and one-half feet in circumference. With wheels of this size the frame of the plows may be thirty inches wide and the plows ten-inch plows, the axle of the driving-wheels being made of the same width (thirty inches) so that the wheels A A' may revolve in the furrows made by them, and thus not interfere with the action of the plows.

What I claim as my invention, and desire to secure by Letters Patent, is—

1. The combination of the wheel K, attached to the axle of the running-wheels, channel N, lever O, spring $w$, spout E, and valve T, all constructed and arranged substantially as and for the purpose shown and specified.

2. The combination of the wheels A A' and their axle, clutches $a$ $a'$ $b$ $b'$, rings $f$ $f'$, rods $n$ $n'$, &c., bands $e$ $e'$ having grooves $o$ $o'$, &c., and levers R, H, and H', all constructed and arranged substantially as and for the purpose shown and specified.

3. The frame V, pole Y, segment $x$, extension X, rods Z $z$, arms $g$ $g'$, D D', W W', and 10 10, lever 11, wheels 9 and A A', all combined, arranged, and constructed substantially as and for the purpose shown and specified.

JNO. T. McELHINEY.

Witnesses:
JACOB MILLER.
CHAS. ALLIN.